(12) United States Patent
Byun et al.

(10) Patent No.: US 11,540,311 B2
(45) Date of Patent: Dec. 27, 2022

(54) METHOD AND APPARATUS FOR TRANSMITTING GRANT-FREE BASED UPLINK DATA IN WIRELESS COMMUNICATION SYSTEM

(71) Applicant: LG Electronics Inc., Seoul (KR)

(72) Inventors: Ilmu Byun, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 16/473,740

(22) PCT Filed: Dec. 26, 2017

(86) PCT No.: PCT/KR2017/015471
§ 371 (c)(1),
(2) Date: Jan. 28, 2021

(87) PCT Pub. No.: WO2018/128312
PCT Pub. Date: Jul. 12, 2018

(65) Prior Publication Data
US 2021/0289539 A1  Sep. 16, 2021

Related U.S. Application Data

(60) Provisional application No. 62/441,976, filed on Jan. 4, 2017.

(51) Int. Cl.
*H04W 72/04* (2009.01)
*H04W 72/14* (2009.01)
(Continued)

(52) U.S. Cl.
CPC ........... *H04W 72/14* (2013.01); *H04L 1/0003* (2013.01); *H04L 1/0061* (2013.01);
(Continued)

(58) Field of Classification Search
None
See application file for complete search history.

(56) References Cited

U.S. PATENT DOCUMENTS 8,929,319 B2 * 1/2015 Anderson ............. H04L 5/0037
370/329
9,282,577 B2  3/2016 Nishio et al.
(Continued)

FOREIGN PATENT DOCUMENTS

| KR | 1020160102448 | 8/2016 |
| KR | 1020160140504 | 12/2016 |
| WO | 2016085621 | 6/2016 |

*Primary Examiner* — Brandon M Renner
(74) *Attorney, Agent, or Firm* — Dentons US LLP

(57) ABSTRACT

Provided are a method and an apparatus for transmitting grant-free based uplink data in a wireless communication system. Specifically, a terminal receives, from a base station, allocation information for a grant-free uplink resource that is semi-statically allocated. The terminal receives, from the base station, allocation information for a first reference signal used for initial transmission of uplink data and allocation information for a second reference signal used for retransmission of the uplink data. The terminal transmits the uplink data through the grant-free uplink resource by using the first reference signal. If decoding of the uplink data fails, the terminal receives, from the base station, an uplink grant corresponding to the second reference signal. The terminal retransmits the uplink data by using the second reference signal on the basis of the uplink grant. The first reference signal is commonly allocated to the terminal, and the second reference signal is specifically allocated to the terminal.

8 Claims, 13 Drawing Sheets

(51) Int. Cl.
*H04W 76/11* (2018.01)
*H04L 1/00* (2006.01)
*H04L 5/00* (2006.01)
*H04W 72/12* (2009.01)

(52) U.S. Cl.
CPC ....... *H04L 5/0051* (2013.01); *H04W 72/0446* (2013.01); *H04W 72/0493* (2013.01); *H04W 72/1263* (2013.01); *H04W 76/11* (2018.02)

(56) References Cited

U.S. PATENT DOCUMENTS

| | | | |
|---|---|---|---|
| 2010/0080184 A1* | 4/2010 | Tseng | H04L 1/08 370/329 |
| 2011/0039568 A1* | 2/2011 | Zhang | H04W 72/14 455/452.1 |
| 2012/0069805 A1* | 3/2012 | Feuersanger | H04W 72/0413 370/329 |
| 2012/0113938 A1* | 5/2012 | Larsson | H04W 74/008 370/329 |
| 2013/0034070 A1* | 2/2013 | Seo | H04L 5/0082 370/329 |
| 2013/0121189 A1* | 5/2013 | Bhattad | H04W 16/14 370/252 |
| 2014/0036859 A1* | 2/2014 | Ekpenyong | H04W 72/1231 370/330 |
| 2014/0169260 A1* | 6/2014 | Nishio | H04J 3/0635 370/312 |
| 2016/0150525 A1* | 5/2016 | Xu | H04W 74/006 370/329 |
| 2016/0353452 A1 | 12/2016 | Chen et al. | |
| 2018/0279340 A1* | 9/2018 | Skordeman | H04W 72/14 |
| 2019/0342037 A1* | 11/2019 | Karaki | H04L 1/1614 |

* cited by examiner

METHOD AND APPARATUS FOR TRANSMITTING GRANT-FREE BASED UPLINK DATA IN WIRELESS COMMUNICATION SYSTEM

CROSS-REFERENCE TO RELATED APPLICATIONS

This application is the National Stage filing under 35 U.S.C. 371 of International Application No. PCT/KR2017/015471, filed on Dec. 26, 2017, which claims the benefit of U.S. Provisional Application No. 62/441,976 filed on Jan. 4, 2017, the contents of which are all hereby incorporated by reference herein in their entirety.

BACKGROUND OF THE INVENTION

Field of the Invention

This specification is related to wireless communication and, most particularly, to a method and apparatus for transmitting grant-free based uplink data in a wireless communication system.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a mobile communication system, data is transmitted/received through a resource allocation process based on BS scheduling to maximize resource utilization, which may lead to an increase in latency of uplink data transmission of a UE. Accordingly, a method of performing a multi-level scheduling request is proposed to minimize the latency of the UE.

SUMMARY OF THE INVENTION

Technical Objects

This specification provides a method and apparatus for transmitting grant-free based uplink data in a wireless communication system.

Technical Solutions

This specification proposes a method and apparatus for transmitting grant-free based uplink data in a wireless communication system.

The apparatus (or device) includes a radio frequency (RF) unit transmitting and receiving radio signals, and a processor being operatively connected to the RF unit.

In this exemplary embodiment, it is assumed that a UE group (multiple UEs) transmits uplink data through a grant-free UL resource, which corresponds to a UE-common resource being scheduled in advance. The grant-free UL transmission may correspond to a method for transmitting uplink data without an uplink grant (UL grant). Therefore, this method is advantageous in that data can be transmitted more quickly than the UL grant based uplink transmission method. However, since the data is transmitted from a UE-common resource, different UEs synchronously transmit a signal from the same resource, which may cause contention. Herein, the UEs may belong to a UE group.

Firstly, the UE receives allocation information for a grant-free uplink (UL) resource being semi-statically allocated by the base station.

The UE receives allocation information for a first reference signal being used for an initial transmission of the uplink data and allocation information for a second reference signal being used for a retransmission of the uplink data.

At this point, the first reference signal is UE-commonly allocated, and the second reference signal is UE-specifically allocated. Herein, the reference signal may correspond to a Demodulation Reference Signal (DMRS).

More specifically, in order to overcome the occurrence of contention, which is caused by synchronously transmitting signals from different UEs, the UE may allocate reference signals that are to be used in the first~$L^{th}$ transmissions as described above. Herein, different UEs may be designated with a reference signal allocation pattern allowing orthogonal reference signals to be allocated at least once during the L number of transmissions.

The UE uses the first reference signal so as to transmit the uplink data via the grant-free UL resource. Herein, when it is assumed that the UE is UE1, UE1 uses DMRS1 so as to transmit the uplink data via the semi-statically allocated grant-free UL resource.

The base station may attempt to decode the uplink data, which is received from the UE. At this point, if the decoding is successful, the communication is completed. However, if the decoding is failed, this indicates that there is a problem. The failure of decoding occurs due to the occurrence of a contention, which results from a synchronous transmission of signals from different UEs. According to the above-described exemplary embodiment, it may be understood that the contention has occurred because UE1 and UE2 have synchronously transmitted the uplink data from the same resource by both using DMRS1.

In case the decoding of the uplink data is failed, the UE receives an uplink grant corresponding to/for the second reference signal from the base station.

Based on the received uplink grant, the UE uses the second reference signal so as to retransmit the uplink data.

According to the above-described exemplary embodiment, in order to retransmit the uplink data, the base station may transmit UL grant 1 corresponding to/for DMRS1 and UL grant 2 corresponding to/for DMRS2. Thus, UE1 receives UL grant 1 and becomes capable of performing retransmission of uplink data based on the received UL grant 1, and UE2 receives UL grant 2 and becomes capable of performing retransmission of uplink data based on the received UL grant 2. Since each UL grant has allocated a different retransmission resource, signal contention does not occur between UE1, which retransmitted the uplink data by using DMRS1, and UE2, which retransmitted the uplink data by using DMRS2. This is because DMRS1 and DMRS2 are orthogonal to one another. More specifically, the second reference signal may be orthogonal to each of the UEs (UE1 and UE2) belonging to the UE group.

The UL grant may be received through a UE-common control channel. Since the uplink signal is transmitted to multiple UEs in which signal contention occurs, a UE-common control channel (e.g., downlink control information (DCI)) may be used. However, a UE having received a UL grant through the UE-common channel shall retransmit the uplink data by using a UE-specific second reference signal. Additionally, the UL grant may be defined as a reference signal-specific UL grant without being received through a UE-common control channel.

A Cyclic Redundancy Check (CRC) of the UL grant may be masked by a temporary identifier according to the first reference signal. More specifically, in order to allow the UE to identify the UL grant, the base station may mask a CRC by using different temporary identifiers (e.g., C-RNTI) for each reference signal that is used for the initial transmission of the uplink data.

Additionally, the grant-free UL resource may be configured of N number of resources, and the uplink data may be transmitted via one of the N number of resources. More specifically, the grant-free UL resource may be divided into N number of transmission units, and, in case N is greater than 1, the UE may transmit the uplink data by randomly selecting one of the n number of resources. In each of the N number of resources, the number of first reference signals being orthogonal to one another may be equal to M.

Accordingly, the number of temporary identifiers may be equal to N*M. The temporary identifier may be received from the base station via Radio Resource Control (RRC) or Medium Access Control (MAC) signaling.

Additionally, the grant-free UL resource may be periodically allocated. In case the grant-free UL resource is deactivated in a specific subframe, a scheduling request resource may be allocated. Since the grant-free UL resource is a UE-common resource, the base station may allocate the grant-free UL resource to a specific UE group and may also allocated a common scheduling request resource. More specifically, the scheduling request resource may correspond to a resource being commonly allocated to the UE group.

The grant-free UL resource may be allocated before a next cycle based on a scheduling request, which is transmitted via the scheduling request resource. More specifically, when a scheduling request is detected, the base station may allocate a grant-free UL resource by transmitting a UE-group common UL grant.

In case the decoding of the retransmitted uplink data is failed, the UE may retransmit the uplink data via a dedicated resource, which is allocated from the base station.

Additionally, information on a Modulation and Coding Scheme (MCS) level and transport power corresponding to/for each UE belonging to the UE group may be received via a downlink data channel. The process of transmitting the information on the MCS level and transport power each time a grant-free UL resource is allocated may result is an excessive waste of resource. Therefore, the waste of resource may be reduced by using a separate signaling via the downlink data channel.

Additionally, in order to retransmit the uplink data, a grant-free based retransmission may be performed without receiving any UL grant. In case the decoding of the uplink data is failed, the UE may use the second reference signal so as to retransmit the uplink data via the grant-free UL resource.

Effects of the Invention

By using the proposed method, when dynamically allocating a grant-free UL resource, a likelihood of contention and reception reliability may be consistently maintained. Additionally, even in case a change in channel status between a user equipment (UE) and a base station and a change in UE transmission data size occur, the reception reliability may be more consistently maintained.

This is a schematic drawing of a procedure for performing a scheduling request for uplink data transmission.

Figure 13:
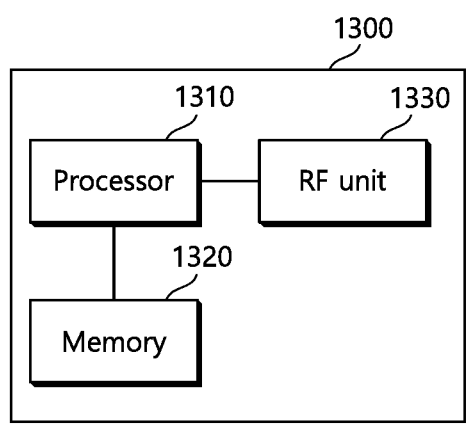

FIG. 13 is a block diagram showing an apparatus for wireless communication for implementing an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
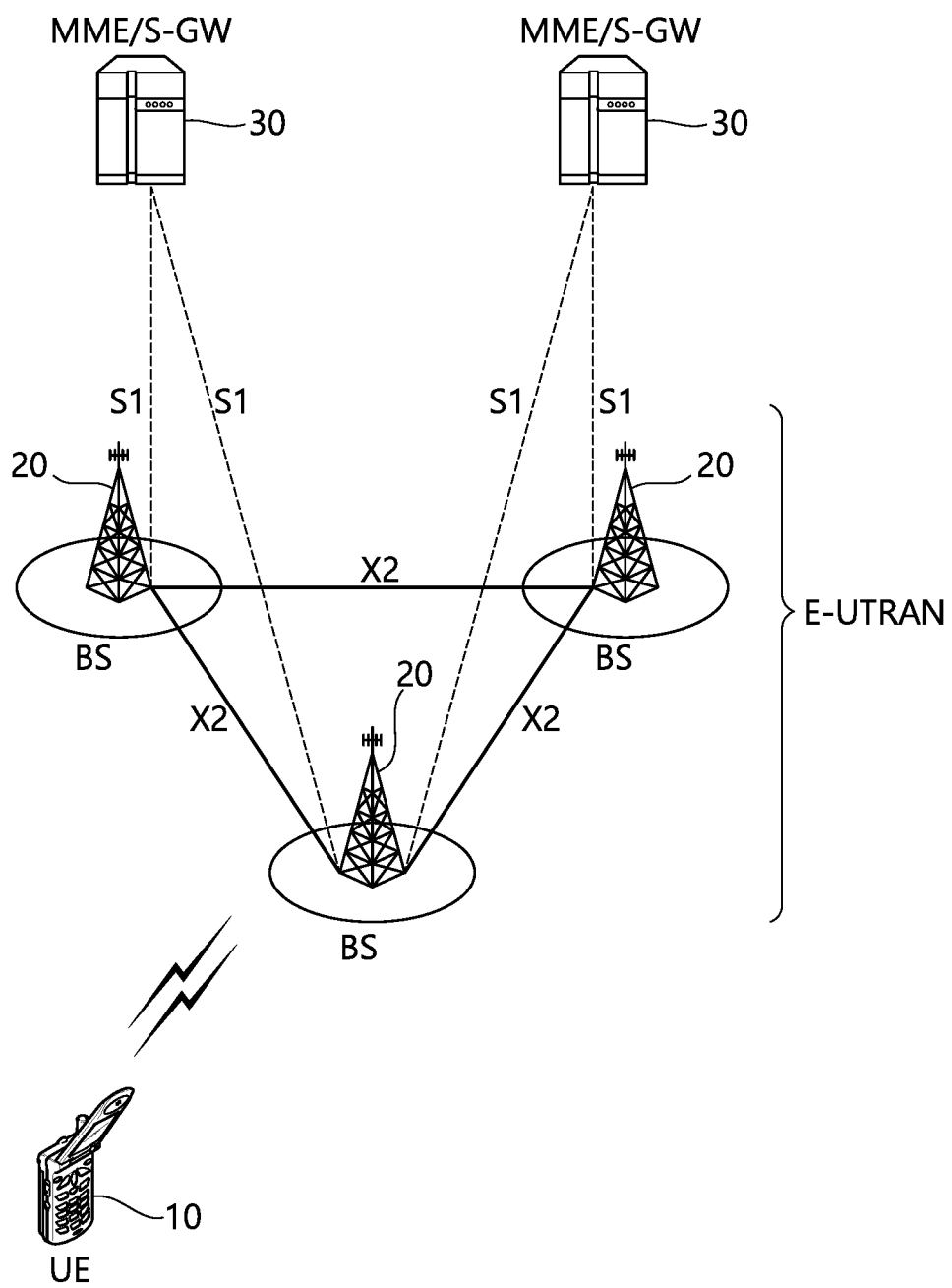
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, etc.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
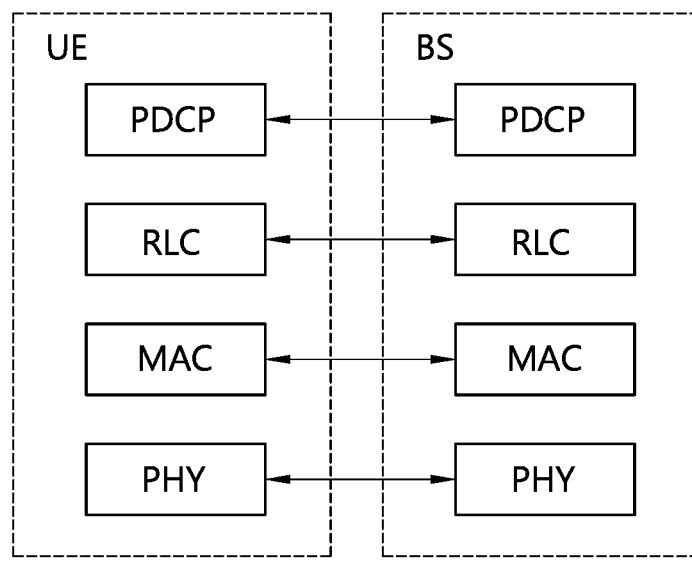
FIG. 2 is a diagram illustrating a radio protocol architecture for a user plane.
Figure 3:
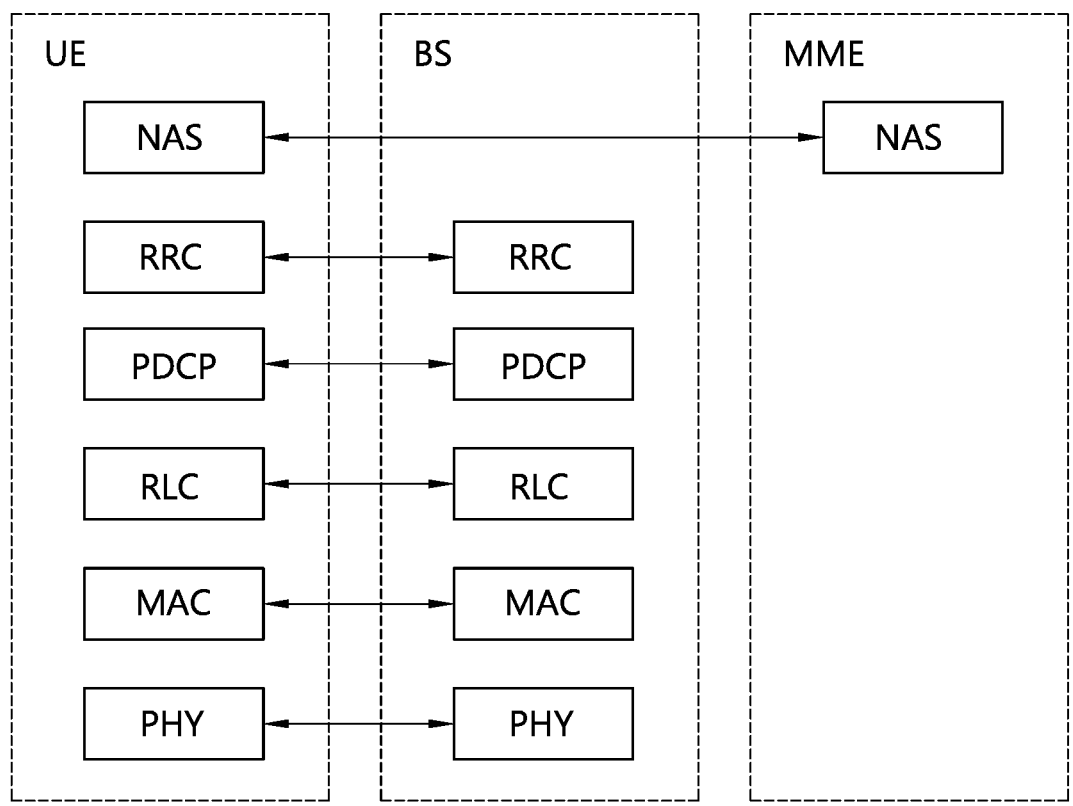
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, semi-persistent scheduling (SPS) is described.

In a next-generation communication system, the SPS is required for a plurality of UEs. An Internet of Things (IoT) service of various industries is expected to be introduced in the next-generation communication system. Representative examples thereof include an automobile, a drone, or the like. In these services, location information is expected to be updated in unit of 100 milliseconds (ms) to 1 second (s) to manage autonomous driving and to prevent accidents. When the location information is updated periodically, the SPS is applied in general to decrease an overhead of an unnecessary control channel.

Figure 4:
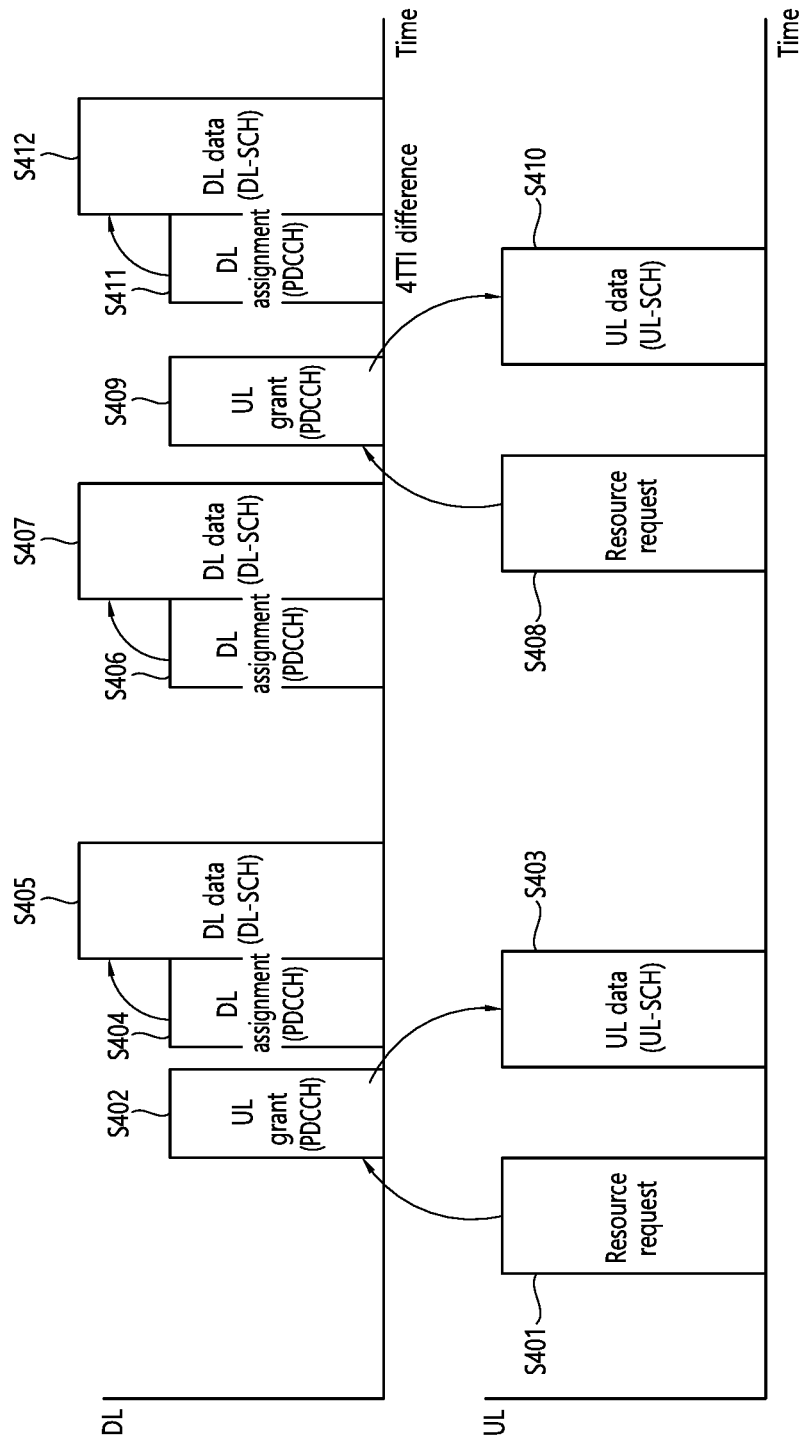
FIG. 4 is a drawing for explaining a method of dynamically assigning a radio resource.
Figure 5:
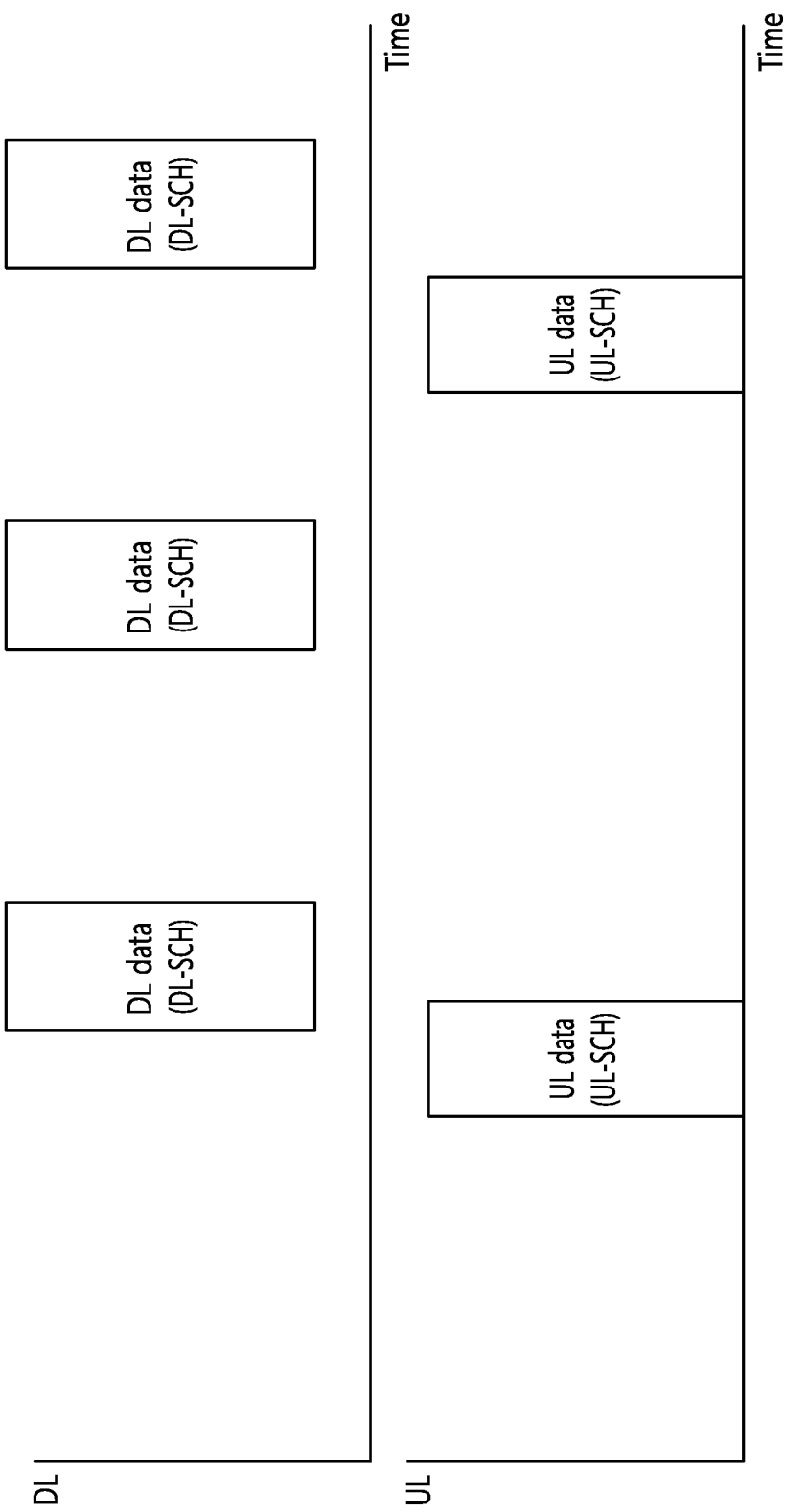
FIG. 5 is a drawing for explaining an SPS method.

FIG. 4 is a drawing for explaining a method of dynamically assigning a radio resource. FIG. 5 is a drawing for explaining a semi-persistent scheduling (SPS) method.

A typical process of transmitting data from a UE to an eNB (a method of dynamically assigning a radio resource) is described below with reference to FIG. 4. First, the UE may request the eNB to provide a radio resource required for transmission of generated data (S40). Therefore, the eNB may assign the radio resource through a control signal according to a radio resource request of the UE (S402). In an LTE system, the resource assignment of the eNB for transmitting UL data of the UE may be transmitted through a UL grant transmitted through a PDCCH. Therefore, the UE may transmit data to the eNB through the assigned radio resource (S403). The radio resource request of the UE, the resource assignment of the eNB, and corresponding UL data transmission of the UE may be optionally repeated (S408 to S410).

Meanwhile, when the eNB transmits downlink (DL) data to the UE, a DL assignment message may be transmitted to the UE through the PDCCH to know through which radio resource the data transmitted to the UE is transmitted (S404), and the eNB may transmit data to the UE through a radio resource corresponding to/for the DL assignment message (S405). In this case, DL assignment information transmission and DL data transmission through a radio resource corresponding thereto may be achieved in the same transmission time interval (TTI). Further, as shown in FIG. 4, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 5. That is, in the SPS method, the eNB does not have to transmit radio resource assignment information all the time through the PDCCH.

Hereinafter, the technology related to 3GPP 5G (New RAT) will be described in detail.

As a larger number of communication devices demand an even larger communication capacity, discussions are being made on the need for a mobile broadband that is more enhanced than the conventional radio access technology (RAT). Additionally, one of the major issues that are to be considered in the next generation communication relates to massive Machine Type Communications (MTC), which connects multiple devices to multiple objects so as to provide diverse services regardless of time and place. Moreover, discussions are being made on a communication system design considering services/terminals (user equipment (UE)) that are sensitive to reliability and latency. As described above, discussions are being made on the adoption of a next generation RAT that considers enhanced mobile broadband communication (eMBB), massive MTC (mMTC), Ultra-Reliable and Low Latency Communication (URLLC), and so on. And, in this specification, the corresponding technology will be referred to as new RAT for simplicity.

Hereinafter, the proposed method is described based on the new RAT system for simplicity in the description. However, in addition to the new RAT system, the scope of the system to which the proposed method is applied may be extendedly applied to other system, such as 3GPP LTE/LTE-A systems, and so on.

The new RAT system uses an OFDM transmission scheme or a similar transmission scheme, and the new RAT system may mainly have an OFDM numerology shown in Table 1. Alternatively, the new RAT system may follow the conventional numerology of LTE/LTE-A without any modification. However, in this case, the new RAT system may have a larger system bandwidth (e.g., 100 MHz). Alternatively, one cell may support a plurality of numerologies. More specifically, multiple UEs (or terminals) each operating on a different numerology may co-exist in one cell. Hereinafter, Table 1 shown below represents OFDM parameters of the new RAT system.

TABLE 1

| Parameter | Value |
| --- | --- |
| Subcarrier-spacing ($f$) | 75 kHz |
| OFDM symbol length | 13.33 us |
| Cyclic Prefix(CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

Hereinafter, a self-contained subframe structure will be described in detail.

Figure 6:
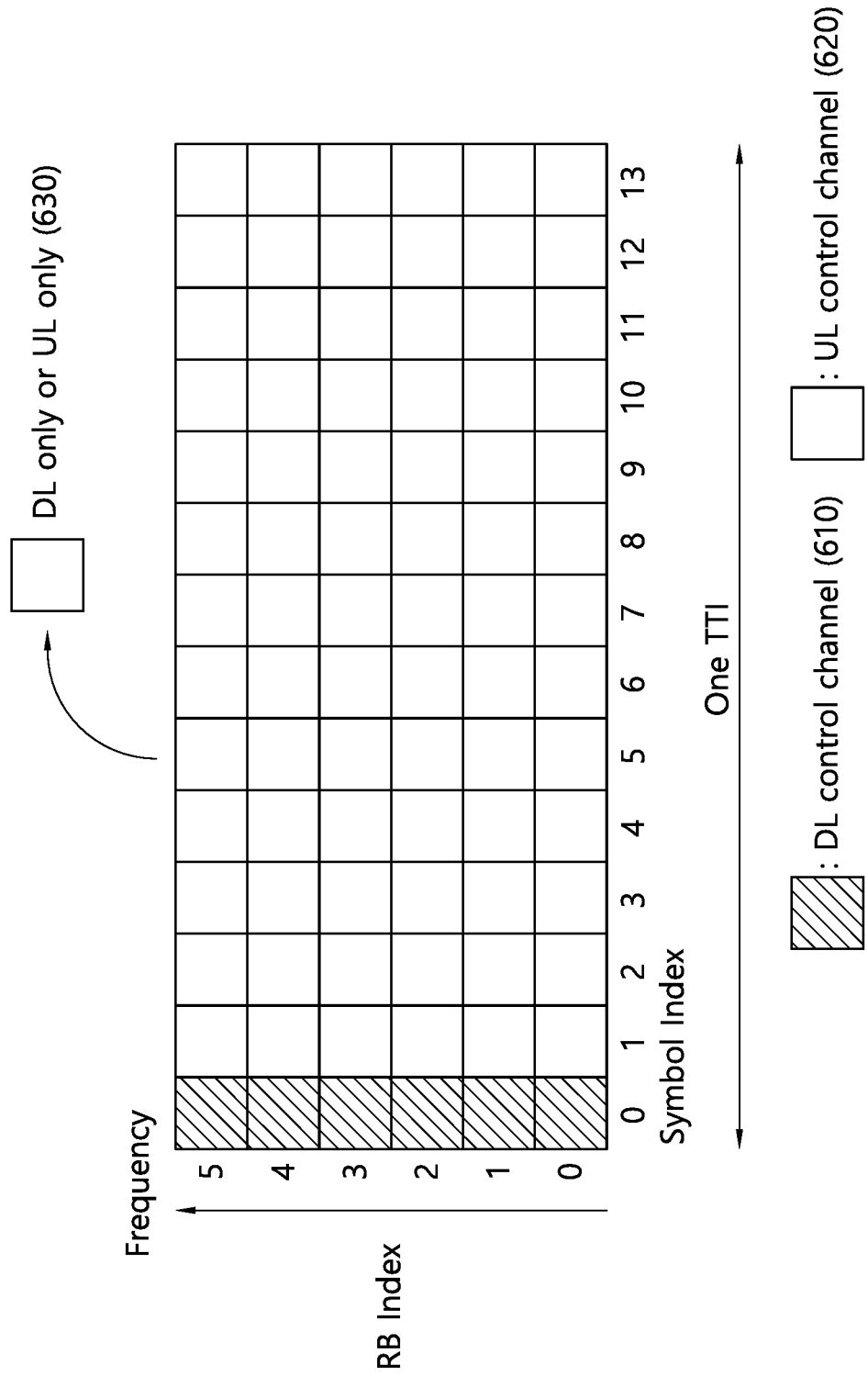
FIG. 6 shows a self-contained subframe structure.

FIG. 6 shows a self-contained subframe structure.

In the TDD system, in order to minimize data transmission latency, as shown in FIG. 6, a self-contained subframe structure (or architecture) is being considered in the new RAT.

In FIG. 6, a region (10) located in front of the self-contained subframe represents a transmission region of a physical channel PDCCH for transporting (or delivering) Downlink Control Information (DCI). A region (620) located behind the self-contained subframe represents a transmission region of a physical channel PUCCH for transporting (or delivering) Uplink Control Information (UCI). Herein, control information being delivered to the UE by the eNB via the DCI includes information related to a cell configuration that should be known by the UE, DL-specific information, such as DL scheduling, and so on, and UL-specific information, such as UL grant, and so on. And, control information being delivered to the eNB by the UE via the UCI includes an ACK/NACK report of an HARQ for DL data, a CSI report for a DL channel status, scheduling request (SR), and so on.

In FIG. 6, a physical channel PDSCH for transmitting downlink data or a physical channel PUSCH for transmitting uplink data may be used in a region (630) located at a center of the self-contained subframe. As a characteristic of the above-described structure (or architecture), a DL transmission and a UL transmission are sequentially performed in one subframe. Thus, DL data may be transmitted from the subframe, and a UL ACK/NACK may be received in the subframe. As a result, a time consumed for performing data retransmission when a data transmission error occurs may be reduced, and, accordingly, latency in the transfer of a final data may be minimized.

In the above-described self-contained subframe structure, a time gap is needed for the base station (or eNB) and the UE to perform a process of shifting from a transmission mode to a reception mode or to perform a process of shifting from a reception mode to a transmission mode. For this, in the self-contained subframe, part of an OFDM symbol corresponding to a time point where DL is shifted to UL is configured as a guard period (GP).

Hereinafter, analog beamforming will be described in detail.

In a Millimeter Wave (mmW), since the wave becomes shorter, multiple antenna elements may be installed in the same surface. More specifically, in a 30 GHz band, since the wave is equal to 1 cm, a total of 100 antenna elements may be installed in a 2-dimensional alignment format on a 5 by 5 cm panel at an interval of 0.5 lambda (wave). Therefore, the mmW seeks to increase the coverage or to increase throughput by increasing a beamforming (BF) gain using multiple antenna elements.

In this case, if a Transceiver Unit (TXRU) is provided so as to enable transport power and phase control per antenna element, independent beamforming per frequency resource may be performed. However, since the TXRU needs to be installed in all of a hundred or more antenna elements, there lies a problem of degraded effectiveness in light of cost. Therefore, a method of mapping multiple antenna elements to one TXRU and controlling a beam direction by using an analog phase shifter is being considered. Such analog beamforming method is disadvantageous in that, since this method can generate only one beam direction within the entire band, frequency-selective beamforming cannot be carried out.

As an intermediate form of digital BF and analog BF, a hybrid BF having B number of TXRUs, which is less than Q number of antenna elements, may be considered. In this case, although differences may exist depending upon the connection method of the B number of TXRUs and the Q number of antenna elements, the number of beam directions may be limited to B or less.

In this specification, for simplicity in the description, a channel through which downlink data is transmitted will be referred to as PDSCH, and a channel through which uplink data is transmitted will be referred to as PUSCH. In this specification, for simplicity in the description, although the present invention is described mostly based on a downlink environment (PDSCH transmission), it will be apparent that the details of this specification can also be applied to an uplink environment (PUSCH transmission).

Figure 7:
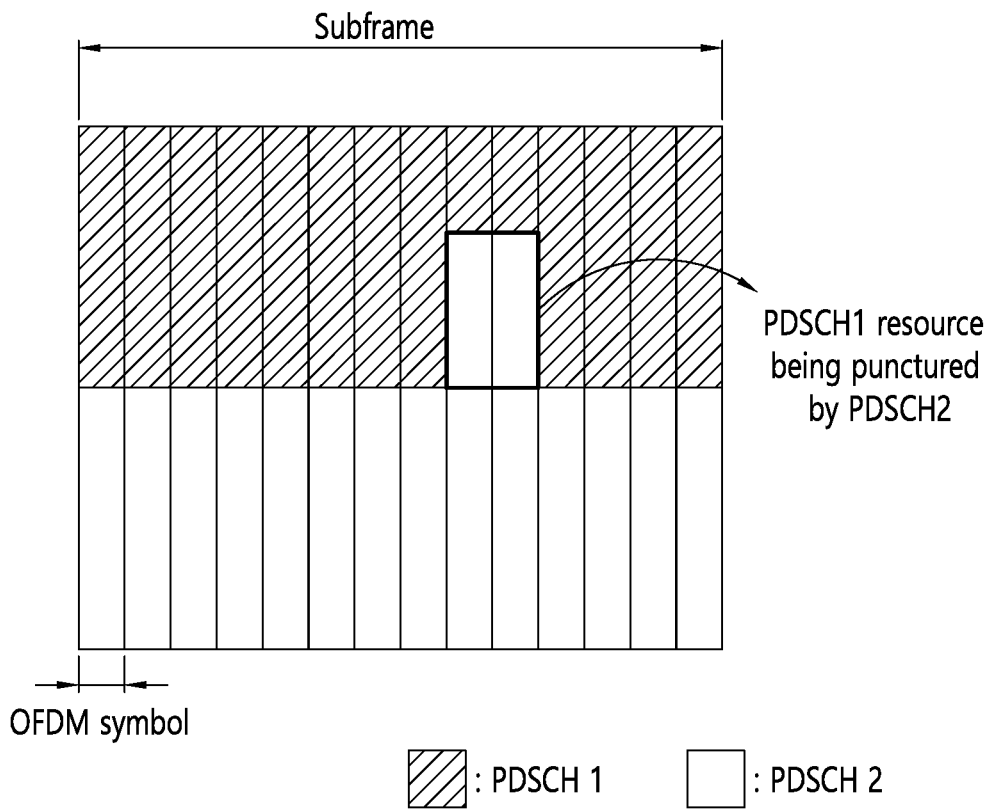
FIG. 7 shows an exemplary usage of resource in a case where URLLC data and eMBB data are multiplexed and transmitted in a same frequency resource of a same cell.

FIG. 7 shows an exemplary usage of resource in a case where URLLC data and eMBB data are multiplexed and transmitted in a same frequency resource of a same cell.

At this point, in case data being sensitive to latency (e.g., URLLC data) is multiplexed with data being relatively less sensitive to latency (e.g., eMBB data) in a same frequency resource of a same cell and then transmitted, contention may occur between the transmission resources of the two data. At this point, since the transmission of latency-sensitive data (or data being sensitive to latency) generally has a higher priority, as shown in FIG. 7, data being sensitive to latency (PDSCH 2) may be transmitted by puncturing the resource of data being less sensitive to latency (PDSCH 1). In this case, since the data being less sensitive to latency (PDSCH 1) is generally transmitted with a TTI length that is longer than the data being more sensitive to latency (PDSCH 2), part of the OFDM symbol region of the data being less sensitive to latency (PDSCH 1) is generally punctured for the transmission of the data being more sensitive to latency (PDSCH 2).

In this case, the data having part of the resource region punctured may experience interference in the corresponding resource, and a significant degradation in performance may occur, accordingly. Therefore, a method for enhancing the performance (or capability) of receiving the transmission data being punctured for the transmission of other data is needed.

Hereinafter, a Grant-free UL transmission will be described in detail.

The Grant-free UL transmission method corresponds to a method of transmitting uplink data in a UE-common resource that is scheduled in advance by the UE. Since the UE transmits uplink data from a resource that is scheduled in advance, this method is advantageous in that data can be transmitted faster than an SR-triggered UL transmission method, which transmits a signal after receiving a UL grant. However, this method is disadvantageous in that, since the signal is transmitted from a UE-common resource, a contention may occur. Herein, a contention refers to an effect of having different UEs each transmit a signal from the same resource.

Additionally, the Grant-free UL resource needs to be reallocated. A Grant-free UL resource corresponds to a resource that is allocated to a UE by a base station after the base station predicts required resources in advance before UE data is generated. If the base station allocates more Grant-free UL resources than needed, the likelihood of contention may be decreased. However, this method is disadvantageous in that resources are wasted. Conversely, if the base station allocates less Grant-free UL resources than needed, the consumption (or waste) of resource may be reduced. However, since the likelihood of contention increases, the targeted reliability cannot be achieved. Therefore, the number of Grant-free UL resources needs to be controlled while considering the number of UEs, the UE traffic characteristic, channel status, and so on. In order to satisfy the targeted reliability, the following factors shall be considered when allocating Grant-free UL resources.

1) Likelihood of signal contention—The likelihood of signal contention occurring between one another within the Grant-free UL resource is determined according to the number of UEs and the size of traffic generated by the UEs. Although the base station may be capable of identifying the number of UEs, it is difficult for the base station to accurately predict the traffic generated by each UE. Generally, when generating traffic, the UE uses statistical characteristics of traffic. Additionally, in order to overcome the limitations in the statistical prediction of traffic, a method of increasing the size of the Grant-free UL resources when the likelihood of contention occurrence is high and decreasing the size of the Grant-free UL resources when the likelihood of contention occurrence is low may be used.

2) Increase in data size—If the data size increases more than expected, the code rate and symbol modulation order, which can be applied when signal is transmitted from a pre-allocated size of the Grant-free UL resource, are increased. Accordingly, since the likelihood of successful reception of the Grant-free UL transmission decreases, a method for resolving this problem is needed.

3) Dynamic TDD—In the NR, a dynamic TDD method allowing DL and UL to be selected in each subframe is expected to be adopted. When it is assumed that a Grant-free UL resource is semi-statically and periodically scheduled, in the dynamic TDD, a subframe having a grant-free UL resource pre-allocated thereto is changed to a DL subframe, thereby causing the grant-free UL resource to be omitted. When part of a periodic grant-free resource is omitted, additional latency may occur during the UL data transmission due to such omission. And, in this case, since the stand-by (or waiting) time becomes longer, when performing grant-free UL transmission afterwards, the likelihood of data contention increases. Therefore, a method for resolving the above-described problem is needed.

4) Change in channel—In case a channel between a UE and the base station is degraded, the size of the Grant-free UL resources needs to be increased. In order to estimate the uplink channel, the base station may request the UE to transmit an uplink reference signal (e.g., SRS).

Therefore, a dynamic resource needs to be allocated. A semi-static (or semi-persistent) resource allocation method and a dynamic resource allocation method may be considered as the resource allocation methods for resolving the above-described problem. Although the semi-static resource allocation method is advantageous in that it can reduce physical layer signaling overhead and achieve high reliability in signaling, the semi-static resource allocation method cannot resolve all of the above-described problems. For example, in dynamic TDD, since the DL and UL can be determined in each subframe, even if the grant-free UL resource is semi-statically allocated, a function that can adaptively change whether or not to apply scheduling in each subframe and a method of the same is needed. Additionally, since the reliability is important in URLLC, it is required to dynamically change resources based on the channel characteristics. Moreover, there may occur a case of abruptly increasing resources in order to resolve contention when traffic is abruptly concentrated due to the occurrence of a particular event. Therefore, a dynamic allocation method of the grant-free UL resource is needed.

Accordingly, this specification proposes a method of dynamically scheduling grant-free UL resources and a method for activating and deactivating semi-static grant-free UL resources.

In this specification, the terms mini-slot, slot, and subframe are used for expressing transmission units. Each of the terms used in this specification may be interchangeably used. For example, the term eMBB-specific subframe of the exemplary embodiment described below may be replaced with the term e-MBB-specific slot. The content of this specification is merely exemplary, and, therefore, the content of this specification may also be applied to other exemplary embodiments applying the same content of this exemplary embodiment.

This specification is broadly divided into 4 different types and described accordingly. A first type corresponds a method of controlling an MCS level according to intervals of the grant-free UL transmission resources in order to maintain consistent reliability. A second type corresponds to a method of changing the size of resources being allocated to a subframe or limiting a transmittable packet arrival time according to intervals of the grant-free UL transmission resources in order to maintain a consistent likelihood of contention. A third type corresponds to a method of configuring a group SR so as to allow the UE to request grant-free UL transmission resource. A fourth type corresponds to a method of transmitting signaling so as to allow the UE to notify an increase in the data size to the base station.

Figure 8:
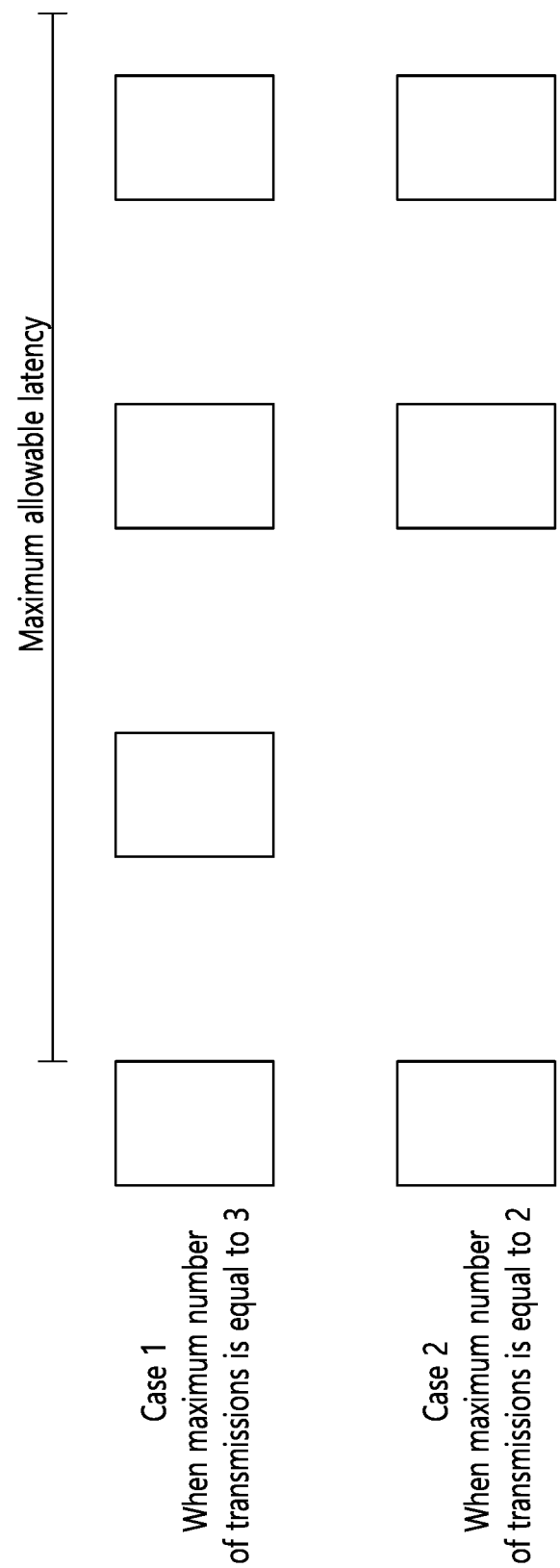
FIG. 8 shows an example wherein a maximum number of transmissions of a Grant-free UL resource changes based on a resource interval according to an exemplary embodiment of this specification.

1. Method for maintaining reliability when changing Grant-free UL transmission resource intervals FIG. 8 shows an example wherein a maximum number of transmissions of a Grant-free UL resource changes based on a resource interval according to an exemplary embodiment of this specification.

In case the Grant-free UL transmission resource is dynamically allocated, or in case part of the semi-statically allocated grant-free UL resource is deactivated, a change occurs in the Grant-free UL transmission resource interval. If the Grant-free UL transmission resource interval increases, this indicates an increase in a maximum packet stand-by (or waiting) time. This causes a decrease in a number of transmissions that can be made within a given maximum allowable latency. If a maximum number of transmissions decreases, reliability being required for each transmission increases. Therefore, in order to satisfy such increase in reliability the MCS level and transport power need to be changed. FIG. 8 shows an example of a case where the Grant-free UL transmission resource interval is changed causing the maximum number of transmissions within a limited time to decrease from 3 to 2.

According to a first exemplary embodiment, the base station semi-statically notifies the MCS level and/or transport power that is to be applied to the UE based on a time interval between a preceding grant-free UL resource and a following grant-free UL resource. Herein, the time interval indicates a maximum waiting time for a packet. The UE changes the MCS level and/or transport power that is to be used when applying uplink based on the time interval between the grant-free UL resources being allocated to the UE. For example, the base station notifies 2 transport powers that are to be used in semi-statically and periodically allocated grant-free UL resources. One is a transport power corresponding to/for a case where there is no deactivated resource, and the other is a transport power being applied to a case where one of the periodic resources is deactivated. After receiving such transmission power, if the UE determines that a grant-free UL resource is deactivated in a particular subframe, the UE transmits a signal by increasing the transport power in a next grant-free UL resource. This is to increase the signal transmission reliability.

As another example, the base station may consider a case of dynamically allocating grant-free UL resources for each subframe. Although the base station transmits a UL grant as UE-common information, the UL grant does not include MCS level information per UE. The UE selects an MCS level that is to be used when performing UL transmission by calculating a time interval between its previously allocated grant-free UL resource and its newly allocated grant-free UL resource (the UE determines the MCS level directly (or by itself)).

The signaling that is transmitted to the UE by the base station in order to apply the above-described method may select a default MCS or transport power based on a default interval, and, based on this selection, the signaling may notify the MCS or transport power corresponding to/for the interval. For example, it will be assumed that the default interval is T and that the corresponding MCS is MCS 7. In this case, it may be understood that, if the interval is incremented by t1, the MCS is incremented by L1, and, if the interval is incremented by t2, the MCS is incremented by t2.

Additionally, the UE may be allocated with multiple grant-free UL resources. For example, in case UE1 is allocated with Resource 1 and Resource 2, there may exist a case where UE2 is allocated with Resource 1 and UE3 is allocated with Resource 2. If UE1 is allocated with Resource 1 at time T1, and, afterwards, if UE1 is allocated with Resource 2 at time T2, and, afterwards, if UE1 is allocated with Resource 3 at time T3, a time interval that is used by the UE for selecting an MCS level is equal to T3-T2.

In relation to the first exemplary embodiment, a time interval between a preceding grant-free UL resource and a following grant-free UL resource indicates a maximum waiting time for a packet. If the waiting time for a packet increases, the number of retransmissions within a targeted time decreases. Therefore, the base station semi-statically notifies an MCS level and/or transport power according to the maximum number of retransmissions within a targeted time to the UE, and the UE deduces a maximum number of retransmissions from the time interval of the grant-free UL resources and selects an MCS level and/or transport power that is to be applied.

The method of the UE for deducing the maximum number of retransmissions may be deduced in the form of an equation or may be deduced by using a table. An example of performing deduction by using a table is as shown below. In case the interval corresponds to 1-3 mini-slots (or subframes), the maximum number of retransmissions within 1 ms may be equal to 2, and, in case the interval corresponds to 4-6 mini-slots (or subframes), the maximum number of retransmissions within 1 ms may be equal to 1, and, in case the interval corresponds to 7 mini-slots (or subframes) or more, the maximum number of retransmissions within 1 ms may be equal to 0. An example of performing deduction by using an equation is as shown below. It will be assumed that a time being consumed for an initial transmission is T and that a time being consumed from after the initial transmission to the retransmission is RTT, and that the targeted time is 1 ms. In this case, a maximum number of retransmissions according to the waiting time W may be calculated as shown below.

$$m < (1-W-T)/RTT \quad \text{[Equation 1]}$$

The equation may be obtained from W+T+m*RTT<1 ms. Herein, T and RTT may correspond to values that are predetermined in the system, and the base station may notify these values to the UE via RRC signaling.

In relation to the first exemplary embodiment of the present invention, a case where the base station dynamically allocates Grant-free UL resources will be assumed. The base station uses a UE-common UL grant so as to transmit information indicating UE-common MCS level and/or transport power along with the grant-free UL resource. Herein, the information indicating the MCS level and transport power may be expressed as a resource interval, or a waiting time or maximum allowable number of retransmissions, or a virtual MCS level, and so on. Each of the UEs that has received the corresponding information increases or decreases the MCS and transport power based on the corresponding information based on the default MCS and transport power.

This technology has been designed while considering a case where some of the UEs fail to receive a UL grant for the allocation of preceding grant-free UL resources. For example, UEs that have failed to receive a UL grant for the allocation of preceding grant-free UL resources may set up their transport power based on a more precedent grant-free UL resource. At this point, if only the corresponding UEs transmit signals using a transport power that is higher than that of other UEs, there may exist a problem in signal decoding of other UEs transmitting signals from the same RB. Therefore, information indicating an increase and/or decrease in MCS levels and transport powers for each UL grant may be transmitted as UE-common information.

For example, a case where UE1 is semi-statically allocated with a transport power according to resource intervals p0, p2, p3 based on p1, and where UE2 is semi-statically allocated with a transport power according to resource intervals p0, p2 based on P1 will be assumed. If it is indicated that the transport power is to be increased by 1 level in the common UL grant for the grant-free UL transmission, UE1 uses p2 and UE2 uses P2 so as to transmit uplink signals.

In relation to the first exemplary embodiment, the base station semi-statically transmits signaling indicating a degree of increase in resources based on the MCS to the UE. The UE identifies the grant-free UL resource being allocated to itself based on the MCS by using the received information. This indicates that the UE identifies a change in the resource size based on the time interval (e.g., subframe interval) between the grant-free UL resources.

A case where the UE is allocated with Resource 1 as the grant-free UL resource may be considered. The UE varies the resource size that is used when performing signal transmission from Resource 1 based on the MCS level of the signal. As the MCS level becomes lower, the resource size for signal transmission becomes larger. For example, when a coding rate indicated by the MCS is ⅓, signal may be transmitted by using 6 RBs in Resource 1, and, in case the coding rate is ⅔, signal may be transmitted by using only 3 RBs in Resource 1. If the size of Resource 1 is small, as the MCS level becomes lower, the size of Resource 1 may need to be increased. For example, in case the maximum number of RBs of Resource 1 is equal to 3 RBs, the number of RBs of Resource 1 may need to be increased in order to allow the UE to transmit a signal by using a coding rate of ⅓.

Although a method of increasing the likelihood of a successful signal transmission when performing retransmission of a grant-free UL transmission without using the first exemplary embodiment of the present invention may be considered, in this case, a disadvantage exists in that, since a target Block Error Rate (BLER) of the retransmission is set to a low level, a larger number of resources needs to be used as compared to when performing retransmission. More specifically, it will be more advantageous to control the MCS level than to retransmit the grant-free UL transmission.

2. Method for maintaining likelihood of contention when changing the Grant-free UL transmission interval In case Grant-free UL transmission resources are dynamically allocated, or in case some of the semi-statically allocated grant-free UL resources are deactivated, a change occurs in the grant-free UL transmission resource interval. If the interval between the grant-free UL transmission resources increases, an average number of packets reached between the allocated resources also increases. Thus, since the likelihood of contention between signals increases when performing Grant-free UL transmission, a method that can consistently maintain the likelihood of contention is needed.

According to a second exemplary embodiment, the base station semi-statically and periodically allocates Grant-free UL transmission resources to the UE. Additionally, the base station indicates a resource size that is to be applied during activation based on a number of consecutively deactivated resources. The UE identifies the resource size that is to be used during activation based on the number of consecutively deactivated resources. For example, a case where the base station semi-statically allocates Resource 1, Resource 2, and Resource 3 as Grant-free UL transmission resources to the UE may be considered. Herein, Resource 1 is the default resource. In case Resource 1 is consecutively activated, the UE performs the grant-free UL transmission only in Resource 1. If activation is performed after being deactivated once, the grant-free UL transmission is performed in Resource 1 and Resource 2. If activation is performed after being deactivated twice, the grant-free UL transmission is performed in Resource 1~Resource 3.

In order to apply this technology, a signal for indicating deactivation or activation shall be transmitted from the mini-slot (or subframe or slot) to which the grant-free UL resource is allocated. Although a deactivation indicator is generally transmitted based on the allocation cycle of the grant-free UL resource, the following methods may be applied in order to allow the transmission point to become more dynamic.

In relation to the second exemplary embodiment, in case a grant-free UL transmission resource is deactivated in a mini-slot (or subframe or slot) to which the grant-free UL resources are periodically allocated, the operations of the base station and the UE are as described below. Generally, the base station transmits a deactivation indicator from a mini-slot to which the grant-free UL resources are allocated and does not transmit any deactivation or activation indicator from other mini-slots. In case the grant-free UL resource is deactivated, activation or deactivation indicators are transmitted for each mini-slot. A UE that has received the deactivation indicator attempts to detect a deactivation or activation indicator from each mini-slot until an activation indicator is received. If the UE detect the activation indicator, the UE may perform grant-free UL transmission from a frequency resource (e.g., resource block), which was semi-statically allocated in advance.

A same sequence may be used as the activation indicator and the deactivation indicator for performing the above-described operations. For example, in case Sequence 1 is transmitted from a semi-statically allocated mini-slot, when the UE detects Sequence 1, the UE may determine that the grant-free UL resource is deactivated. After the grant-free UL is deactivated, if the UE detects Sequence 1 from a mini-slot that does not correspond to a mini-slot having the grant-free UL resources periodically allocated thereto, the UE may determine that the grant-free UL resource is activated.

In relation to the second exemplary embodiment, the resource size being applied during activation increases in proportion with the time interval between activated resources or a number of previously consecutively deactivated resources.

The likelihood of contention between signals being transmitted from the UE is proportional to the number of packets arrived between the preceding grant-free UL resource and the following grant-free UL resource. Generally, an average number of arrived packets increases in proportion to the resource interval, and the likelihood of contention reduces so as to be inversely proportional to the resource size. Therefore, in order to consistently maintain the likelihood of contention, the resource size needs to be increased in proportion to the time interval.

Figure 9:
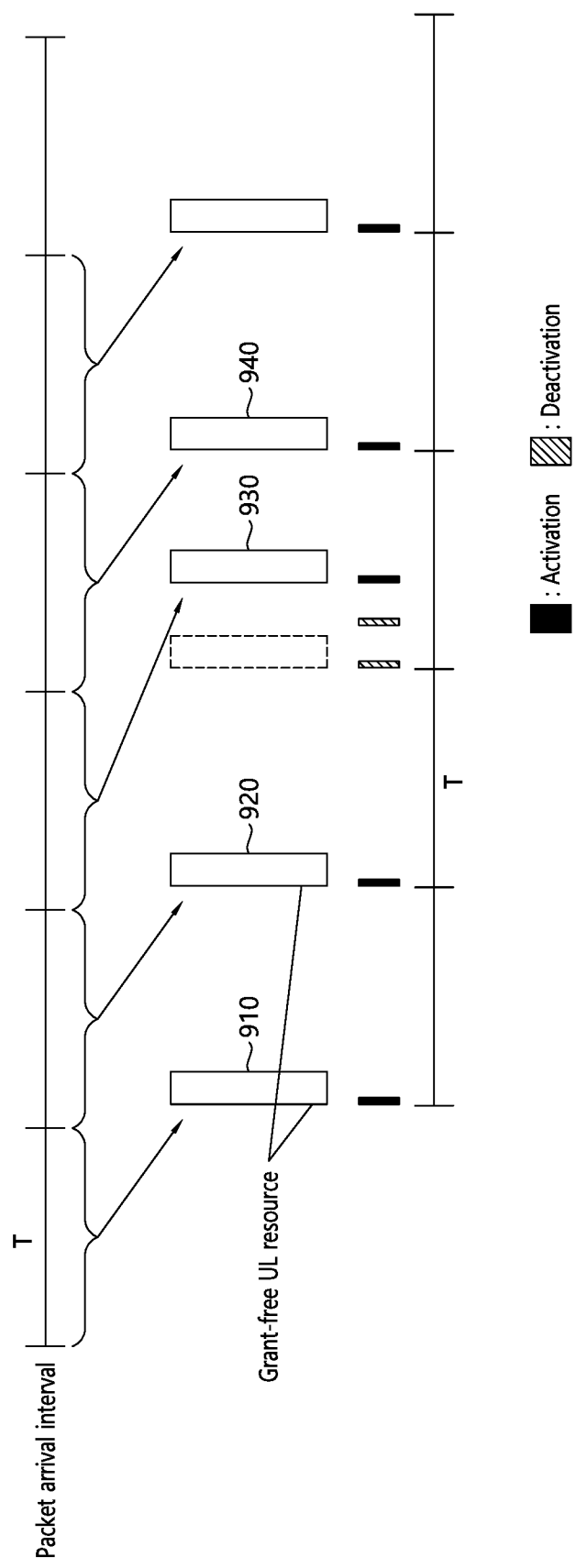
FIG. 9 shows an exemplary mapping of a packet arrival duration and a Grant-free UL resource according to an exemplary embodiment of this specification.

FIG. 9 shows an exemplary mapping of a packet arrival duration and a Grant-free UL resource according to an exemplary embodiment of this specification.

According to a third exemplary embodiment, the base station configures a packet arrival section to the UE, and if the sections to which the packet arrives are different from one another, the UE indicates via RRC signaling that the transmission should be performed from different grant-free UL resources. Additionally, the base station may notify grant-free UL resources corresponding to/for each packet arrival section of the UE. This may be notified according to a rule or by using an explicit table format. For example, a UE that has received a packet arrival section configuration indicator from the base station may configure a packet arrival section as shown in FIG. 9. In case the semi-static allocation cycle of grant-free UL resources being allocated to the UE from the base station is T, the UE configures the packet arrival section as T. Since an encoding time may differ for each UE, the UE may randomly configure a time interval between the packet arrival section and the grant-free UL resource. Among the periodic grant-free UL resources, after a grant-free UL resource is deactivated, if the corresponding resource is scheduled to a mini-slot after n number of resources, the UE operations corresponding to/for this case are as described in FIG. 9. Even the UE is capable of transmitting a packet that arrives at a fourth section of FIG. 9 from a third grant-free UL resource (930), according to a pre-configured arrangement, the UE transmits the corresponding packet from a fourth grant-free UL resource (940).

In this method, the packet arrival section and the grant-free UL resource are in a one-to-one correspondence. Considering this characteristic, for each packet arrival section, a respective grant-free UL resource needs to be allocated. Therefore, in case of dynamically allocating the grant-free UL resources, an average number per time of the UL grant and the packet arrival section shall be equal to one another.

According to a fourth exemplary embodiment, when the UE determined that its UL signal reception has failed, the UE may attempt to perform retransmission in a grant-free UL resource. In order to allow the base station to aggregate the signal first transmitted by the UE and a second signal transmitted by the UE, the UE needs to transmit additional signaling. For example, the UE may generate a separate control signal including a new data indicator (NDI) and retransmission process ID (PCID) information and may transmit the newly generated control signal with the uplink data. After receiving the newly received control signal and the uplink data, if the NID and the PCID transmitted by the UE are the same as one another, the base station may aggregate the corresponding signals. In order to do so, in case the base station successfully performs decoding of the corresponding control signal but fails to decode the data, the base station shall store the data signal, which has failed to be decoded, in a buffer during a time period t. Therefore, the UE shall perform retransmission by using the grant-free UL resource within the given time t. The base station may notify the time t information to the UE via RRC signaling or L2/L3 signaling.

In order to allow the base station to identify the control signal before the base station performs decoding of the data signal, the control signal needs to be transmitted from a resource that is different from that of the data signal. For example, the control signal may be transmitted from neighboring REs of a DMRS within the subframe, and the data signal may be transmitted from another RE.

3. UL grant transmission method for Grant-free UL resource allocation

In case the base station dynamically allocates the grant-free UL resource, or, in case the semi-static grant-free UL resource is deactivated and the UE requests for additional resource allocation, or requests additional resources for retransmission, in order to allocate the grant-free UL resources, a new UL grant design and a new scheduling request (SR) need to be adopted. Therefore, an SR for grant-free UL resource quest and UL grant signaling will be proposed in the following description.

According to a fifth exemplary embodiment, the base station transmits a UE group common UL grant and allocates a UE group common grant-free UL transmission resource. The grant-free UL resource may then be divided into N number of transmission units, and, in case N is greater than 1, the UE may randomly select one of the N number of resources and may then perform the UL transmission. Additionally, the corresponding UE may be included in a multiple UE group and may be allocated with multiple grant-free UL resources.

In the above-described description, the base station may semi-statically designate a data transmission-dedicated reference signal (e.g., DMRS) of each UE, or the base station may allow the UE to randomly select a data transmission-dedicated reference signal. If the base station allocates a reference signal to each UE in advance so that the reference signals are orthogonal to one another, and in case N=1, the reference signals for performing grant-free UL transmission are always orthogonal to one another. However, if the base station allows the UE to select only the reference signals that are orthogonal to one another, it may be disadvantageous in that the maximum number of UEs being allocated to the grant-free UL resources can be limited by the number of reference signals being orthogonal to one another.

UEs belonging to the same UE group attempt to perform decoding of the UL grant signal by using the same temporary identifier (e.g., C-RNTI). Therefore, a UE being allocated with multiple grant-free UL resources may be allocated with multiple temporary identifiers. If the UL grant for grant-free UL resource scheduling is masked by using the C-RNTI, a common C-RNTI is used when performing CRC check.

Figure 10:
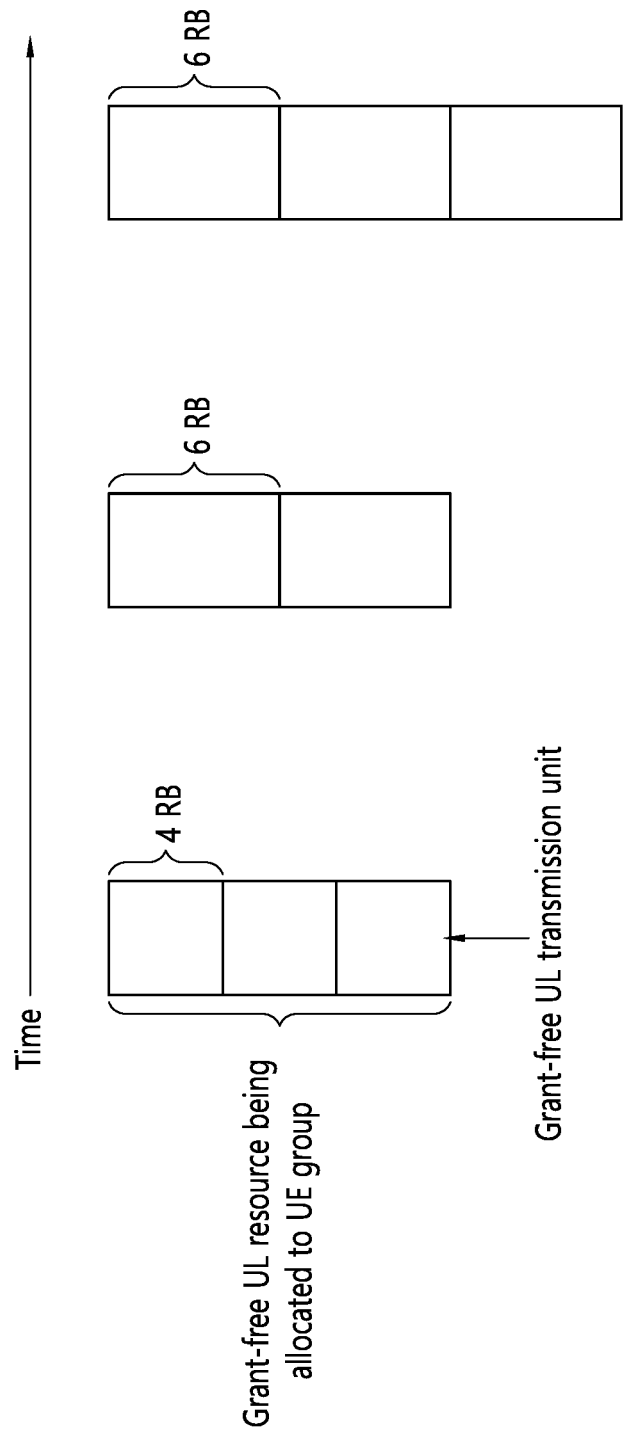
FIG. 10 shows an exemplary configuration of a Grant-free UL resource and a transmission unit within the resource.

FIG. 10 shows an exemplary configuration of a Grant-free UL resource and a transmission unit within the resource.

FIG. 10 shows an exemplary embodiment of a case where grant-free UL resources are grouped as N number of orthogonal resources. As shown in the drawing, in the first part, a total of 12 RBs are allocated as the grant-free UL resources, which are then grouped as 3 resources each having the size of 4 RBs. In the next part, a total of 12 RBs are allocated as the grant-free UL resources, which are then grouped as 2 resources each having the size of 6 RBs. And, in the last part, a total of 18 RBs are allocated as the grant-free UL resources, which are then grouped as 3 resources each having the size of 6 RBs. If each of UE1 and UE2 selects a different transmission unit and transmits a signal, the base station may receive the reference signal and data signal of UE1 and UE2 without contention.

In relation to the fifth exemplary embodiment, the resource allocation information of the UL grant allocating the grant-free UL resources is configured as described below. Information indicating the total grant-free UL resources that can be used by the corresponding UE group and N are transmitted. After receiving the information and N, the UE uses the corresponding information so as to identify the size of the grant-free UL transmission unit and the MCS of the grant-free UL transmission unit. For example, when the total grant-free UL resources are configured of 24 resource blocks, and when N=4, the unit according to which the UE performs grant-free UL transmission is 6 RBs. When N=6, the unit according to which the UE performs grant-free UL transmission is 4 RBs. Additionally, in case of N=6, signal transmission is performed by using a higher coding rate or modulation order than the case of N=4. More specifically, if the unit performing grant-free unit transmission becomes smaller, the MCS level increases.

In this exemplary embodiment, in order to allow the UE to select an MCS, the UE shall receive MCS level information corresponding to/for the resource unit from the base station in advance. For example, if the UE receives an MCS level corresponding to/for a case where the grant-free UL resource unit is equal to 4RB, the UE may estimate an MCS level corresponding to/for a case where the grant-free UL resource unit is equal to 6RB. If the UE seeks to transmit a signal by using an MCS level that is lower than the MCS level being provided by a single transmission unit, or if the UE seeks to transmit a data size that is larger than the scheduled data, the UE may transmit the signal by using multiple transmission units. However, this method is disadvantageous in that the likelihood of contention increases.

In relation to the fifth exemplary embodiment, the base station semi-statically configures multiple grant-free UL resources to a UE group. Thereafter, the base station dynamically transmits information indicating activation and deactivation information of each resource for each mini-slot (or subframe or slot) in a UL grant format. For example, after the base station semi-statically allocates N number of grant-free UL transmission resources, the base station may indicate activation and deactivation of each resource in a bitmap format by using N number of bits from the UL grant.

In this description, if the allocation cycle of the semi-statically allocated grant-free UL resource is set to 1, the grant-free UL resource may be configured (or set) for each mini-slot.

In relation to the fifth exemplary embodiment, a case where each UE separately transmits an indicator for notifying transmission or non-transmission of data to the base station is considered. The base station may explicitly notify or implicitly notify a resource for transmitting an indicator to the UL grant.

If each UE separately transmits an indicator for notifying transmission or non-transmission of data to the base station, even in case the base station fails to decode a signal transmitted from a UE, the base station may identify the UE that has transmitted the corresponding signal. Therefore, when performing retransmission, the base station may allocate dedicated resources for uplink signal transmission to each UE. Even in case the base station has allocated in advance orthogonal DMRSs to each UE, the base station may be capable of identifying the UE that has attempted to perform signal transmission. However, in this case, it is disadvantageous in that a larger number of UEs than the number of orthogonal DMRSs cannot be allocated to the grant-free UL transmission unit.

Herein, resource allocation information for transmitting an indicator is included in a UL grant for the grant-free UL resource allocation. The UE transmits the indicator from part of the resources among the uplink data channels.

It will be given that the number of UEs sharing the Grant-free UL resource is equal to X, and that the number of orthogonal resources that can be generated from a single RB for transmitting an indicator is equal to Y. If the number of data transmission dedicated RBs being indicated by the UL grant for the grant-free UL resource allocation is equal to Z, L=ceil(X/Y) number of RBs are used for the purpose of transmitting indicators, and only Z-L number of RBs are used for the purpose of grant-free UL transmission. Among the Z number of RBs, the L number of RBs transmitting indicators may correspond to L number of resources having the lowest indexes among the Z number of logical resources.

In order to perform the above-described operations, the UE should be in a state of completing the identification the number of UEs within a UE group in advance via RRC signaling, and so on. Additionally, when the grant-free UL resources are categorized as N number of transmission units, the number of RBs being included in each transmission unit is equal to (Z-L)/N.

According to a sixth exemplary embodiment, the base station allocates an SR resource that is common to a UE group being allocated within the same grant-free UL resources. If a scheduling request is detected from the corresponding SR resource, the base station transmits a UE-group common UL grant and allocates the grant-free UL transmission resources.

The base station may allocate the grant-free UL resources before receiving a request from the UE. However, in case a UE intending to transmit uplink data consistently fails to be allocated with the grant-free UL resource, the corresponding UE may request resource allocation by using the signal. Alternatively, in a situation where the grant-free UL resource is semi-statically and periodically configured, there may exist a case where the grant-free UL resource of a particular subframe is deactivated. After the deactivation, the base station may perform operations allowing the grant-free UL resources to be allocated before the next cycle, only in a case where the grant-free UL resource request is made by using a common SR resource.

In relation to the sixth exemplary embodiment, a group SR resource is allocated only in a case where the grant-free UL resources, which are periodically and semi-statically allocated by the base station, are deactivated.

According to a seventh exemplary embodiment, the base station transmits different UL grants based on a reference signal (e.g., DMRS), which is used by the UE when transmitting a signal from a single grant-free UL resource. In order to allow the UE to identify the UL grant, the UE transmits a UL grant by using different temporary identifiers (e.g., C-RNTI) per reference signal used by the UE (e.g., the C-RNTI is masked to the CRC or the C-RNTI is included in the UL grant as information). For this, the base station transmits a C-RNTI per DMRS of the grant-free UL resources to the UE via RRC or MAC signaling. For example, a case where the base station has failed to perform signal decoding even though UE1 and UE2 have transmitted signals by using DMRS1 and UE3 has transmitted a signal by using DMRS 2 may be considered. At this point, UE1 and UE2 receive a UL grant being masked with a CRC by using the same C-RNTI, and UE3 receives a UL grant being masked with a CRC by using a separate C-RNTI.

When using the above-described method, the likelihood of contention during retransmission may be reduced. Firstly, a case a random selection of a reference signal, which is used by the UE for data transmission, for each transmission is considered. In the exemplary embodiment, when performing retransmission, although UE1 and UE2 are allocated with the same resources, UE3 is allocated with different resources. Therefore, when performing retransmission, the likelihood of the DMRS used by the UE1 being the same as the DMRS used by another UE becomes lower than in the first transmission.

In case the UE randomly selects a reference signal, since the likelihood of contention between reference signals still remains even when performing retransmission, the following method, which will be described below, may be used.

In relation to the seventh exemplary embodiment, the base station notifies a grant-free UL transmission dedicated reference signal (e.g., DMRS), which is to be used during each transmission, such as a first transmission, a second transmission (first retransmission), . . . , Nth retransmission, and so on, to the UE via RRC or MAC signaling. For example, a case where 4 orthogonal reference signals exist in the grant-free UL resource and a total of 16 UEs are allocated to the corresponding grant-free UL resources will be assumed. For the first transmission, the base station allocates Reference Signal 1 to UE1~UE4, Reference Signal 2 to UE5~UE8, Reference Signal 3 to UE9~UE12, and Reference Signal 4 to UE13~UE16. For the second transmission, the base station allocates Reference Signal 1 to UE1, UE5, UE9, and UE13, Reference Signal 2 to UE2, UE6, UE10, and UE14, Reference Signal 3 to UE3, UE7, UE11, and UE15, and Reference Signal 4 to UE4, UE8, UE12, and UE16. The following table shows an example of allocating reference signals when performing the first transmission and retransmission (second transmission).

TABLE 2

| UE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Reference signal index used when performing first transmission | 1 | | | | 2 | | | | 3 | | | | 4 | | | |
| Reference signal index used when performing second transmission | 1 | 2 | 3 | 4 | 5 | 6 | 7 | 8 | 9 | 10 | 11 | 12 | 13 | 14 | 15 | 16 |

By using this method, in case M number of orthogonal reference signals exist, a total of M^L number of UEs may be identified through L number of transmissions. When using the above-described exemplary embodiment, the base station may identify a total of 16 (4^2) UE through 2 transmissions.

For example, a case where UE1 and UE2 transmit signals by using Reference Signal 1 and UE9 transmits a signal by using Reference Signal 2 will be assumed. Even though the base station has received Reference Signal 1 and Reference Signal 2, in case the base station has failed to perform data decoding of the two signals, the base station transmits UL grant 1 and UL grant 2 corresponding to/for Reference Signal 1 and Reference Signal 2 for the retransmission. In case each of the UL grants allocates different retransmission resources, signal contention does not occur between a UE that has transmitted a signal by using Reference Signal 1 and a UE that has transmitted a signal by using Reference Signal 2. Additionally, in a resource allocated by UL grant 1, since UE1 transmits signals by using Reference Signal 1 and UE2 transmits signals by using Reference Signal 2, the base station may identify that UE1 and UE2 have transmitted the signals. If the base station fails to perform signal decoding even during the retransmission, the base station may allocate contention-free dedicated resource to each of UE1 and UE2. Thus, all of the UEs within the third transmission may transmit data without contention.

Additionally, when the maximum number of transmissions that can be performed by the UE within a targeted time is equal to L, the base station indicates only a reference signal until an $(L-1)^{th}$ transmission. When a number of orthogonal reference signals within grant-free UL resources is equal to M, the number of UEs to which the base station can allocate a single grant-free UL resource is equal to $M^{(L-1)}$. According to the above-described example, if L=3, since the number of reference signals is M=4, the number of UEs to which the base station can allocate a single grant-free UL resource is equal to $4^2=16$.

In order to satisfy a high reception reliability of the URLLC, among a total of L transmissions, one transmission needs to have no likelihood of contention or the likelihood of contention needs to be close to 0. When the base station identifies a UE that has transmitted the signal, since the base station can transmit a dedicated UL grant of the corresponding UE, if the maximum number of transmissions is equal to L, the base stations shall be capable of identifying all of the UEs during the $(L-1)t^h$ transmission, which precedes the last transmission. For example, when the maximum number of transmissions is equal to 3 within 1 ms and the number of orthogonal DMRSs is equal to 8, the base station may designate a DMRS of the UE only until the second transmission (retransmission). At this point, if the base station receives signals up to the retransmission signal, the base station may identify a total of 64 UEs ($8^2=64$).

In relation to the seventh exemplary embodiment, a temporary identifier (e.g., C-RNTI), which is used in the UL grant dedicated to the grant-free UL resource transmitted by the base station, may vary depending upon the grant-free UL resource and reference signal according to which the UE transmits signals. For example, when the grant-free UL resources are divided to N number of transmission units, and when the number of reference signals being orthogonal to each transmission unit is equal to M, N*M number of temporary identifiers each being different from one another are needed. The base station may notify information on the N*M number of temporary identifiers to the UE via RRC or MAC signaling.

According to an eighth exemplary embodiment, apart from a UL grant for the grant-free UL resource allocation, a signaling for designating the MCS and transport power of each UE is transmitted from a downlink data channel A length of a downlink control signal (DL grant) for transmitting the signal is configured to have the same length as the UL grant for the grant-free UL resource allocation. A UL grant for the grant-free UL resource allocation and a DL grant for notifying a transmission resource of the MCS and transport power information may be differentiated from one another by using a flag field within the control signal or by masking the CRC by using different temporary identifiers.

In a grant-free UL transmission, multiple UEs may be allocated with the same resource. For example, since the likelihood of contention is low when a packet arrival rate of each UE is low, 20 UEs or more may be synchronously allocated with resources within one RB. At this point, since resource is excessively wasted when the MCS and uplink power information are transmitted each time a resource is allocated for a grant-free UL transmission, a separate signaling needs to be used (using downlink data channel) in order to perform such transmission. By generating separate signaling, signals may be transmitted at a lower frequency than the UL grant for the resource allocation. Additionally, in case the MCS and power information of multiple UEs are transmitted all at once, since the size of the information becomes larger, signals may be transmitted by using a data channel instead of a downlink control channel.

In relation to the eighth exemplary embodiment, the base station transmits multiple MCS and transport power information for each UE. For example, a case where the total number of RBs of the grant-free UL resource is equal to M, where the corresponding grant-free UL resource is divided into N number of transmission sections, and where the RB of each transmission section is L=M/N may be considered. If the types of L that can be allocated to the UE by the base station is equal to a total of A number of types, the base station may transmit A number of MCS and transport power information to the UE. Herein, the types of L may be semi-statically designated to the UE via RRC or MAC signaling. Thereafter, the UE determines the MCS and transport power that are to be applied to the grant-free UL transmission based on the L value.

In this exemplary embodiment, if the number of UEs is equal to B, the base station delivers A*B number of MCS and transport power information to the UE. Additionally, the exemplary embodiment assumes a case where a number of information bits for indicating the MCS and transport power information is designated in advance in the system. In this case, if the base station notifies an order by which the MCS and transport power information that are to be received by each UE, each UE may identify the positions of its MCS and transport power information.

In addition to the above-described information, in case the size of the data received by the UE increases, the UE shall increase the MCS for transmitting data from the designated resource. Therefore, in preparation for this case, MCS and transport power information may be additionally transmitted.

Figure 11:
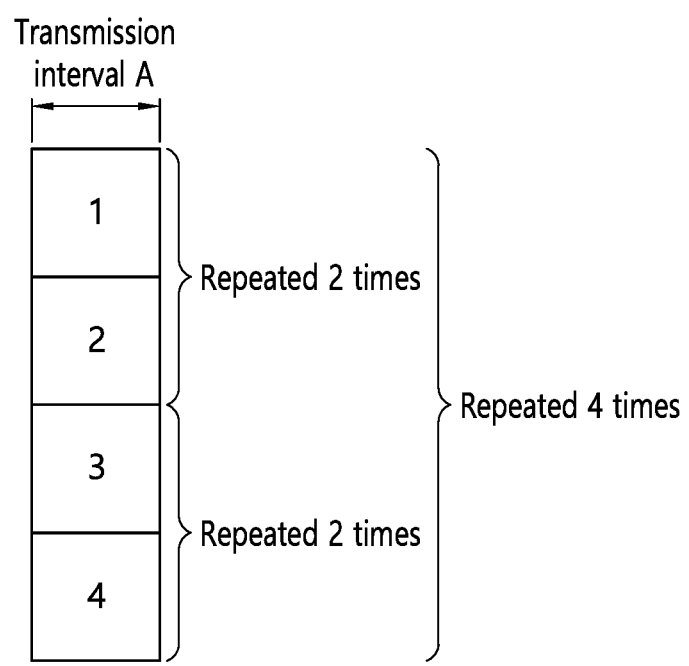
FIG. 11 shows an example of repeatedly transmitting a same signal, by a user equipment (UE), during multiple Grant-free UL transmission durations according to an exemplary embodiment of this specification.

FIG. 11 shows an example of repeatedly transmitting a same signal, by a user equipment (UE), during multiple Grant-free UL transmission durations according to an exemplary embodiment of this specification.

In relation to the eighth exemplary embodiment, although the UE basically transmits a signal in one grant-free UL transmission section, the UE may also repeatedly transmit the same signal randomly in multiple grant-free UL transmission sections. At this point, the UE transmits a signal by using the same reference signal (e.g., DMRS) even in different transmission sections. Additionally, the sections during which the same signal may be repeatedly transmitted may be indicated by the base station to the UE in advance via RRC and L2/L3 signaling or may be systematically designated.

Referring to FIG. 11, the UE may repeatedly transmit a signal 2 times by using Resources 1 and 2 in a specific transmission section A. Additionally, the UE may repeatedly transmit a signal 2 times by using Resources 3 and 4 in a specific transmission section A. Additionally, the UE may repeatedly transmit a signal 4 times by using Resources 1, 2, 3, and 4 in a specific transmission section A. At this point, the DMRS of a signal, which is repeatedly transmitted by the UE is always the same. Since the base station does not know the number of repeated transmissions of the UE, the base station may know how many times the UE has repeatedly transmitted a signal by referring to the DMRS.

When a same signal is repeatedly transmitted in different sections, the base station that has received such signals may aggregate the signals each being different from one another and may attempt to perform signal decoding. In case a signal is repeatedly transmitted, when contention occurs in one resource and contention does not occur in another resource, it is advantageous in that the base station can stably decode the signal corresponding to/for the part where contention does not occur. Additionally, when the channel status between the UE and the base station is poor, the SNR may be increased, thereby maintaining the decoding likelihood.

Since the base station does not know the number of repeated transmissions of the UE, the base station shall identify such repeated transmission by performing blind decoding. In order to reduce decoding complexity, a signal being repeatedly transmitted by the same UE always has the same DMRS and may limit in advance resources enabling the same signal to be repeatedly transmitted.

4. Method for notifying change in data size

In case a size of data intended to be transmitted by the UE from the grant-free UL resource is larger than initially estimated, the UE needs to transmit an uplink signal by using a larger amount of resource. If the resources that are initially allocated to the UE are insufficient, the UE needs to transmit a signal requesting an increase in resource allocation to the base station.

According to a ninth exemplary embodiment, the base station allocates a resource capable of transmitting an indicator notifying an increase in data size to the UE. The data size increase indicator may be UE-commonly allocated. Therefore, the UEs may each be allocated with a data transmission indicator and may be commonly allocated with a data size increase indicator. For example, UE1 to UE3 transmit data along with the data transmission indicator, and UE1 transmits a data size increase indicator to the base station. In case the base station successfully decodes the data of UE2 and fails to decode the data of UE1 and UE3, since the base station does not know which one of UE1 and UE3 has transmitted the data size increase indicator, the base station assumes that data is increased in both UE1 and UE3 and allocates retransmission resource accordingly.

This method is advantageous in that the likelihood of decoding a retransmission signal can be increased. However, this method is disadvantageous in that an excessive amount of resources is unnecessarily allocated. However, in case the retransmission likelihood is equal to 0.1 or less, a rate of the resources being wasted in the actual system may be maintained at a low level.

Figure 12:
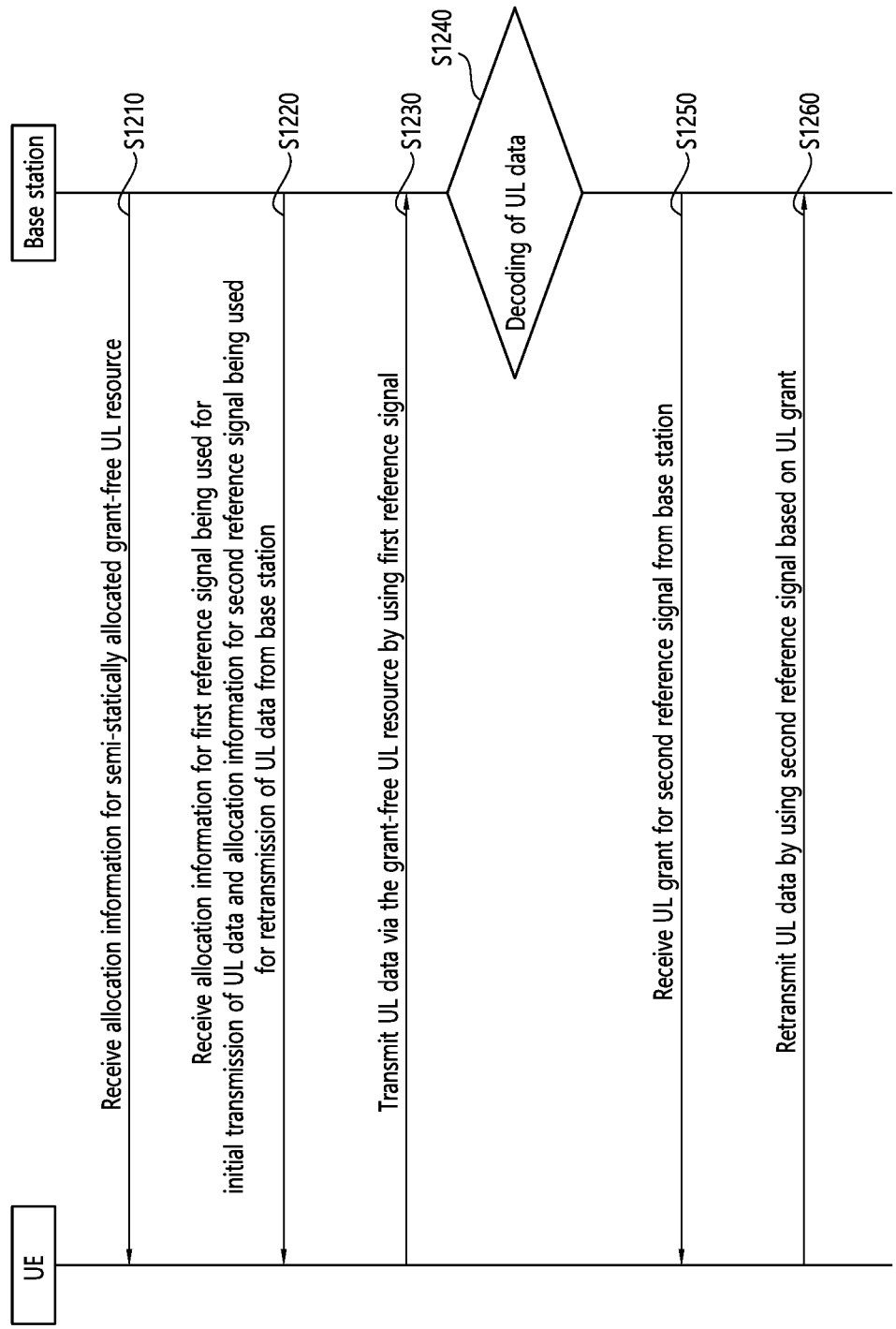
FIG. 12 shows a schematic drawing of a procedure for transmitting uplink data via Grant-free UL resource according to an exemplary embodiment of this specification.

FIG. 12 shows a schematic drawing of a procedure for transmitting uplink data via Grant-free UL resource according to an exemplary embodiment of this specification.

In this exemplary embodiment, it is assumed that a UE group (multiple UEs) transmits uplink data through a grant-free UL resource, which corresponds to a UE-common resource being scheduled in advance. The grant-free UL transmission may correspond to a method for transmitting uplink data without an uplink grant (UL grant). Therefore, this method is advantageous in that data can be transmitted more quickly than the UL grant based uplink transmission method. However, since the data is transmitted from a UE-common resource, different UEs synchronously transmit a signal from the same resource, which may cause contention. Herein, the UEs may belong to a UE group.

Firstly, in step S1210, the UE receives allocation information for a grant-free uplink (UL) resource being semi-statically allocated by the base station.

In step S1220, the UE receives allocation information for a first reference signal being used for an initial transmission of the uplink data and allocation information for a second reference signal being used for a retransmission of the uplink data.

At this point, the first reference signal is UE-commonly allocated, and the second reference signal is UE-specifically allocated. Herein, the reference signal may correspond to a Demodulation Reference Signal (DMRS).

More specifically, in order to overcome the occurrence of contention, which is caused by synchronously transmitting signals from different UEs, the UE may allocate reference signals that are to be used in the first~$L^{th}$ transmissions as described above. Herein, different UEs may be designated with a reference signal allocation pattern allowing orthogonal reference signals to be allocated at least once during the L number of transmissions.

For example, when L=2, and when 2 reference signals being orthogonal to one another exist, the reference signal may be allocated according to the following pattern.

TABLE 3

|     | First transmission | Second transmission |
| --- | --- | --- |
| UE1 | DMRS 1 | DMRS 1 |
| UE2 | DMRS 1 | DMRS 2 |
| UE3 | DMRS 2 | DMRS 1 |
| UE4 | DMRS 2 | DMRS 2 |

In the conventional method, the number of UEs that can be allocated to the grant-free UL resource was limited to be equal to the M number of reference signals. However, according to the allocation pattern shown in the Table presented above, $M^L$ number of UEs may be identified by using M number of reference signals during L number of transmissions. Additionally, the base station may allocate different reference signals to the UE as the reference signal for the initial transmission and the reference signal for the retransmission.

In step S1230, the UE uses the first reference signal so as to transmit the uplink data via the grant-free UL resource. Herein, when it is assumed that the UE is UE1, UE1 uses DMRS1 so as to transmit the uplink data via the semi-statically allocated grant-free UL resource.

In step S1240, the base station may attempt to decode the uplink data, which is received from the UE. At this point, if the decoding is successful, the communication is completed. However, if the decoding is failed, this indicates that there is a problem. The failure of decoding occurs due to the occurrence of a contention, which results from a synchronous transmission of signals from different UEs. According to the above-described exemplary embodiment, it may be understood that the contention has occurred because UE1 and UE2 have synchronously transmitted the uplink data from the same resource by both using DMRS1.

In step S1250, in case the decoding of the uplink data is failed, the UE receives an uplink grant corresponding to/for the second reference signal from the base station.

In step S1260, based on the received uplink grant, the UE uses the second reference signal so as to retransmit the uplink data.

According to the above-described exemplary embodiment, in order to retransmit the uplink data, the base station may transmit UL grant 1 corresponding to/for DMRS1 and UL grant 2 corresponding to/for DMRS2. Thus, UE1 receives UL grant 1 and becomes capable of performing retransmission of uplink data based on the received UL grant 1, and UE2 receives UL grant 2 and becomes capable of performing retransmission of uplink data based on the received ULgrant 2. Since each UL grant has allocated a different retransmission resource, signal contention does not occur between UE1, which retransmitted the uplink data by using DMRS1, and UE2, which retransmitted the uplink data by using DMRS2. This is because DMRS1 and DMRS2 are orthogonal to one another. More specifically, the second reference signal may be orthogonal to each of the UEs (UE1 and UE2) belonging to the UE group.

The UL grant may be received through a UE-common control channel. Since the uplink signal is transmitted to multiple UEs in which signal contention occurs, a UE-common control channel (e.g., downlink control information (DCI)) may be used. However, a UE having received a UL grant through the UE-common channel shall retransmit the uplink data by using a UE-specific second reference signal. Additionally, the UL grant may be defined as a reference signal-specific UL grant without being received through a UE-common control channel.

A Cyclic Redundancy Check (CRC) of the UL grant may be masked by a temporary identifier according to the first reference signal. More specifically, in order to allow the UE to identify the UL grant, the base station may mask a CRC by using different temporary identifiers (e.g., C-RNTI) for each reference signal that is used for the initial transmission of the uplink data.

Additionally, the grant-free UL resource may be configured of N number of resources, and the uplink data may be transmitted via one of the N number of resources. More specifically, the grant-free UL resource may be divided into N number of transmission units, and, in case N is greater than 1, the UE may transmit the uplink data by randomly selecting one of the n number of resources. In each of the N number of resources, the number of first reference signals being orthogonal to one another may be equal to M.

Accordingly, the number of temporary identifiers may be equal to N*M. The temporary identifier may be received from the base station via Radio Resource Control (RRC) or Medium Access Control (MAC) signaling.

Additionally, the grant-free UL resource may be periodically allocated. In case the grant-free UL resource is deactivated in a specific subframe, a scheduling request resource may be allocated. Since the grant-free UL resource is a UE-common resource, the base station may allocate the grant-free UL resource to a specific UE group and may also allocated a common scheduling request resource. More specifically, the scheduling request resource may correspond to a resource being commonly allocated to the UE group.

The grant-free UL resource may be allocated before a next cycle based on a scheduling request, which is transmitted via the scheduling request resource. More specifically, when a scheduling request is detected, the base station may allocate a grant-free UL resource by transmitting a UE-group common UL grant.

In case the decoding of the retransmitted uplink data is failed, the UE may retransmit the uplink data via a dedicated resource, which is allocated from the base station.

Additionally, information on a Modulation and Coding Scheme (MCS) level and transport power corresponding to/for each UE belonging to the UE group may be received via a downlink data channel. The process of transmitting the information on the MCS level and transport power each time a grant-free UL resource is allocated may result is an excessive waste of resource. Therefore, the waste of resource may be reduced by using a separate signaling via the downlink data channel.

Additionally, in order to retransmit the uplink data, a grant-free based retransmission may be performed without receiving any UL grant. In case the decoding of the uplink data is failed, the UE may use the second reference signal so as to retransmit the uplink data via the grant-free UL resource.

FIG. 13 is a block diagram showing an apparatus for wireless communication for implementing an embodiment of the present invention.

An apparatus (1300) for wireless communication includes a processor (1310), a memory (1320), and a radio frequency (RF) unit (1330).

The processor (1310) may be configured to implement proposed functions, procedures and/or methods described in this description. Layers of the radio interface protocol may be implemented in the processor (1310). The processor (1310) may handle a procedure explained above. The memory (1320) is operatively coupled with the processor (1310), and the RF unit (1330) is operatively coupled with the processor (1310).

The processor (1310) may include application-specific integrated circuit (ASIC), other chipset, logic circuit and/or data processing device. The memory (1320) may include read-only memory (ROM), random access memory (RAM), flash memory, memory card, storage medium and/or other storage device. The RF unit (1330) may include baseband circuitry to process radio frequency signals. When the embodiments are implemented in software, the techniques described herein can be implemented with modules (e.g., procedures, functions, and so on) that perform the functions described herein. The modules can be stored in the memory (1320) and executed by the processor (1310). The memory (1320) can be implemented within the processor (1310) or external to the processor (1310) in which case those can be communicatively coupled to the processor (1310) via various means as is known in the art.

In view of the exemplary systems described herein, methodologies that may be implemented based on the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE), the method comprising:
receiving, from a base station, information for a semi-statically configured uplink (UL) resource;
receiving, from the base station, allocation information for a first reference signal for an initial transmission of UL data and allocation information for a second reference signal for a retransmission of the UL data;
performing the initial transmission of the UL data via the semi-statically configured UL resource based on the first reference signal;

receiving, from the base station, a UL grant for the retransmission of the UL data after performing the initial transmission; and performing the retransmission of the UL data via a UL resource related to the UL grant based on the second reference signal, wherein at least one of the first reference signal and the second reference signal comprises a UE-specific reference signal, wherein a cyclic redundancy check (CRC) of the UL grant is masked by a temporary identifier, wherein information on a modulation and coding scheme (MCS) level and transmit power for the UE is received via a downlink data channel, wherein at least one of the initial transmission and the retransmission is performed based on the MCS level and transmit power, wherein the semi-statically configured UL resource occurs periodically, wherein, in case the semi-statically configured UL resource is deactivated in a specific subframe of a period, a scheduling request resource is allocated, and wherein the semi-statically configured UL resource is allocated before a next period with respect to the period based on a scheduling request being transmitted via the scheduling request resource.

2. The method of claim 1, wherein the second reference signal is orthogonal to the first reference signal.

3. The method of claim 2, wherein the semi-statically configured UL resource comprises N number of resources,
wherein the uplink data is transmitted via one of the N number of resources,
wherein a number of first reference signals being orthogonal to one another in each of the N number of resources is equal to M,
wherein a number of temporary identifiers is equal to N*M, and
wherein the temporary identifier is received from the base station via radio resource control (RRC) or medium access control (MAC) signaling.

4. The method of claim 1, further comprising:
in case decoding the retransmitted uplink data fails, performing a further retransmission of the uplink data via a dedicated resource allocated by the base station.

5. A user equipment (UE) comprising:
a memory;
a transceiver; and
at least one a processor operatively coupled to the memory and the transceiver,
wherein the at least one processor is configured to:
control the transceiver to receive, from a base station, information for a semi-statically configured uplink (UL) resource;
control the transceiver to receive, from the base station, allocation information for a first reference signal for an initial transmission of UL data and allocation information for a second reference signal for a retransmission of the UL data;
control the transceiver to perform the initial transmission of the UL data via the semi-statically configured UL resource based on the first reference signal,
control the transceiver to receive, from the base station, a UL grant for the retransmission of the UL data after performing the initial transmission; and
control the transceiver to perform the retransmission of the UL data via a UL resource related to the UL grant based on the second reference signal,
wherein at least one of the first reference signal and the second reference signal comprises a UE specific reference signal,
wherein a cyclic redundancy check (CRC) of the UL grant is masked by a temporary identifier,
wherein information on a modulation and coding scheme (MCS) level and transmit power for the UE is received via a downlink data channel,
wherein at least one of the initial transmission and the retransmission is performed based on the MCS level and transmit power,
wherein the semi-statically configured UL resource occurs periodically,
wherein, in case the semi-statically configured UL resource is deactivated in a specific subframe of a period, a scheduling request resource is allocated, and
wherein the semi-statically configured UL resource is allocated before a next period with respect to the period based on a scheduling request being transmitted via the scheduling request resource.

6. The device of claim 5, wherein the second reference signal is orthogonal to the first reference signal.

7. The device of claim 6, wherein the semi-statically configured UL resource comprises N number of resources,
wherein the uplink data is transmitted via one of the N number of resources,
wherein a number of first reference signals being orthogonal to one another in each of the N number of resources is equal to M,
wherein a number of temporary identifiers is equal to N*M, and
wherein the temporary identifier is received from the base station via radio resource control (RRC) or medium access control (MAC) signaling.

8. The device of claim 5, wherein the at least one processor is further configured to control the transceiver to, in case decoding the retransmitted uplink data fails, perform a further retransmission of the uplink data via a dedicated resource allocated by the base station.

* * * * *